United States Patent
Kim et al.

(10) Patent No.: US 12,531,011 B2
(45) Date of Patent: Jan. 20, 2026

(54) GATE DRIVING CIRCUIT AND DISPLAY APPARATUS INCLUDING THE SAME

(71) Applicant: Samsung Display Co., LTD., Yongin-si (KR)

(72) Inventors: Eok Su Kim, Yongin-si (KR); Jongdo Keum, Yongin-si (KR); Taesang Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 17 days.

(21) Appl. No.: 18/513,917

(22) Filed: Nov. 20, 2023

(65) Prior Publication Data

US 2024/0257724 A1 Aug. 1, 2024

(30) Foreign Application Priority Data

Jan. 30, 2023 (KR) ........................ 10-2023-0012137

(51) Int. Cl.
*G09G 3/32* (2016.01)

(52) U.S. Cl.
CPC ....... *G09G 3/32* (2013.01); *G09G 2310/0267* (2013.01); *G09G 2310/0294* (2013.01); *G09G 2310/061* (2013.01); *G09G 2310/08* (2013.01)

(58) Field of Classification Search
None
See application file for complete search history.

(56) References Cited

U.S. PATENT DOCUMENTS 9,202,827 B2 12/2015 Koyama et al.
2016/0210890 A1* 7/2016 Lim .................. G09G 3/20

FOREIGN PATENT DOCUMENTS

| KR | 1020200047847 A | 5/2020 |
| KR | 102128579 B1 | 7/2020 |
| KR | 102241774 B1 | 4/2021 |

* cited by examiner

*Primary Examiner* — Ifedayo B Iluyomade
(74) *Attorney, Agent, or Firm* — CANTOR COLBURN LLP

(57) ABSTRACT

A gate driving circuit includes: a first pull-up control circuit, a pull-up circuit, a pull-down circuit and an inverting circuit. The first pull-up control circuit applies a previous carry signal which is one of carry signals of previous stages to a first control node in response to the previous carry signal. The pull-up circuit outputs a gate clock signal as a gate output signal in response to a signal of the first control node. The pull-down circuit outputs a second low voltage as the gate output signal in response to a first next carry signal which is one of carry signals of next stages. The inverting circuit outputs one of a first signal and a first low voltage to a third control node in response to the first signal and a signal of a second control node.

20 Claims, 14 Drawing Sheets

GATE DRIVING CIRCUIT AND DISPLAY APPARATUS INCLUDING THE SAME

This application claims priority to Korean Patent Application No. 10-2023-0012137, filed on Jan. 30, 2023, and all the benefits accruing therefrom under 35 U.S.C. § 119, the content of which in its entirety is herein incorporated by reference.

BACKGROUND

1. Field

Embodiments of the present invention relate to a gate driving circuit and a display apparatus including the gate driving circuit. More particularly, embodiments of the present invention relate to a gate driving circuit for increasing a lifetime of the circuit by separating a control node of a pull-up circuit and a control node of an inverting circuit and a display apparatus including the gate driving circuit.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver and a data driver. The gate driver outputs gate signals to the gate lines. The data driver outputs data voltages to the data lines.

A gate driving circuit of the gate driver may include an inverting circuit generating a control signal for operating a holding circuit. When a voltage applied to a control node of the inverting circuit has a high level, a threshold voltage of a switching element in the inverting circuit is shifted so that the inverting circuit may not normally operate.

When the inverting circuit does not normally operate, the gate driver may not generate a normal gate signal so that the display apparatus may not normally operate.

SUMMARY

Embodiments of the present invention provide a gate driving circuit for reducing a degree of a shift of a threshold voltage of a switching element in an inverting circuit and increasing a lifetime of the circuit by separating a control node of a pull-up circuit and a control node of the inverting circuit.

Embodiments of the present invention also provide a display apparatus including the gate driving circuit.

In an embodiment of a gate driving circuit according to the present invention, the gate driving circuit includes: a first pull-up control circuit, a pull-up circuit, a pull-down circuit and an inverting circuit. The first pull-up control circuit is configured to apply a previous carry signal which is one of carry signals of previous stages to a first control node in response to the previous carry signal. The pull-up circuit is configured to output a gate clock signal as a gate output signal in response to a signal of the first control node. The pull-down circuit is configured to output a second low voltage as the gate output signal in response to a first next carry signal which is one of carry signals of next stages. The inverting circuit is configured to output one of a first signal and a first low voltage to a third control node in response to the first signal and a signal of a second control node.

In an embodiment, a maximum voltage of the second control node may be less than a maximum voltage of the first control node.

In an embodiment, the first signal may be a direct-current inverter voltage.

In an embodiment, the first signal may be a gate high voltage defining a high level of the gate output signal.

In an embodiment, the first signal may be a gate clock signal.

In an embodiment, the inverting circuit may include a 12-1 switching element including a control electrode configured to receive the first signal, a first electrode configured to receive the first signal and a second electrode connected to a twelfth intermediate node, a 12-2 switching element including a control electrode configured to receive the first signal, a first electrode connected to the twelfth intermediate node and a second electrode connected to a control electrode of a seventh switching element, the seventh switching element including the control electrode connected to the second electrode of the 12-2 switching element, a first electrode configured to receive the first signal and a second electrode connected to the third control node, a thirteenth switching element including a control electrode connected to the second control node, a first electrode connected to the control electrode of the seventh switching element and a second electrode configured to receive the second low voltage and an eighth switching element including a control electrode connected to the second control node, a first electrode connected to the third control node and a second electrode configured to receive the first low voltage.

In an embodiment, the gate driving circuit may further include an inverting control circuit configured to apply a gate high voltage defining a high level of the gate output signal to the second control node in response to the signal of the first control node.

In an embodiment, the inverting control circuit may include a 16-1 switching element including a control electrode connected to the first control node, a first electrode configured to receive the gate high voltage and a second electrode connected to a sixteenth intermediate node and a 16-2 switching element including a control electrode connected to the first control node, a first electrode connected to the sixteenth intermediate node and a second electrode connected to the second control node.

In an embodiment, the gate driving circuit may further include a second pull-up control circuit configured to apply the first low voltage to the first control node in response to a second next carry signal which is one of the carry signals of the next stages.

In an embodiment, the gate driving circuit may further include a first holding circuit configured to apply the first low voltage to the first control node in response to a signal of the third control node.

In an embodiment, the gate driving circuit may further include a second holding circuit configured to output the second low voltage as the gate output signal in response to a signal of the third control node.

In an embodiment, the gate driving circuit may further include a carry pull-up circuit configured to output a carry clock signal as a carry signal in response to the signal of the first control node and a carry pull-down circuit configured to output the first low voltage as the carry signal in response to the first next carry signal.

In an embodiment, the gate driving circuit may further include a third holding circuit configured to output the first low voltage as the carry signal in response to a signal of the third control node.

In an embodiment, the gate driving circuit may further include a second pull-up circuit configured to output a second gate clock signal as a second gate output signal in response to the signal of the first control node and a second pull-down circuit configured to output the second low voltage as the second gate output signal in response to the first next carry signal.

In an embodiment, the gate driving circuit may further include a fourth holding circuit configured to output the second low voltage as the second gate output signal in response to a signal of the third control node.

In an embodiment, the gate driving circuit may further include a reset circuit configured to apply the first low voltage to the first control node in response to a reset signal.

In an embodiment, the gate driving circuit may further include a sensing selecting circuit configured to apply the previous carry signal to a sensing control node in response to a first sensing signal.

In an embodiment, the gate driving circuit may further include a first sensing control circuit configured to apply a gate high voltage defining a high level of the gate output signal to the first control node in response to a signal of the sensing control node and a second sensing signal and a second sensing control circuit configured to apply the first low voltage to the third control node in response to the signal of the sensing control node and the second sensing signal.

In an embodiment, the first pull-up control circuit may include a 4-1 switching element including a control electrode configured to receive the previous carry signal, a first electrode configured to receive the previous carry signal and a second electrode connected to the second control node and a 4-2 switching element including a control electrode configured to receive the previous carry signal, a first electrode connected to the second control node and a second electrode connected to the first control node. The pull-up circuit may include a first switching element including a control electrode connected to the first control node, a first electrode configured to receive the gate clock signal and a second electrode connected to a gate output terminal and a first capacitor including a first end connected to the control electrode of the first switching element and a second end connected to the gate output terminal. The pull-down circuit may include a second switching element including a control electrode configured to receive the first next carry signal, a first electrode configured to receive the second low voltage and a second electrode connected to the gate output terminal.

In an embodiment of a display apparatus according to the present invention, the display apparatus includes a display panel, a gate driver and a data driver. The gate driver is configured to output a gate signal to a gate line of the display panel. The data driver is configured to output a data voltage to a data line of the display panel. The gate driving circuit of the gate driver includes a first pull-up control circuit, a pull-up circuit, a pull-down circuit and an inverting circuit. The first pull-up control circuit is configured to apply a previous carry signal which is one of carry signals of previous stages to a first control node in response to the previous carry signal. The pull-up circuit is configured to output a gate clock signal as a gate output signal in response to a signal of the first control node. The pull-down circuit is configured to output a second low voltage as the gate output signal in response to a first next carry signal which is one of carry signals of next stages. The inverting circuit is configured to output one of a first signal and a first low voltage to a third control node in response to the first signal and a signal of a second control node.

According to the gate driving circuit and the display apparatus, the control node of the pull-up circuit and the control node of the inverting circuit may be separated. A maximum voltage of the control node of the inverting circuit may be less than a maximum voltage of the control node of the pull-up circuit. Thus, a positive bias temperature stress applied to the eighth switching element and the thirteenth switching element in the inverting circuit may be reduced so that the degree of the shift of the threshold voltages of the eighth switching element and the thirteenth switching element in the inverting circuit may be reduced.

When the degree of the shift of the threshold voltages of the switching elements in the inverting circuit is reduced, the reliability of the gate driving circuit may be effectively enhanced and the lifetime of the gate driving circuit may be effectively increased.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION OF THE INVENTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
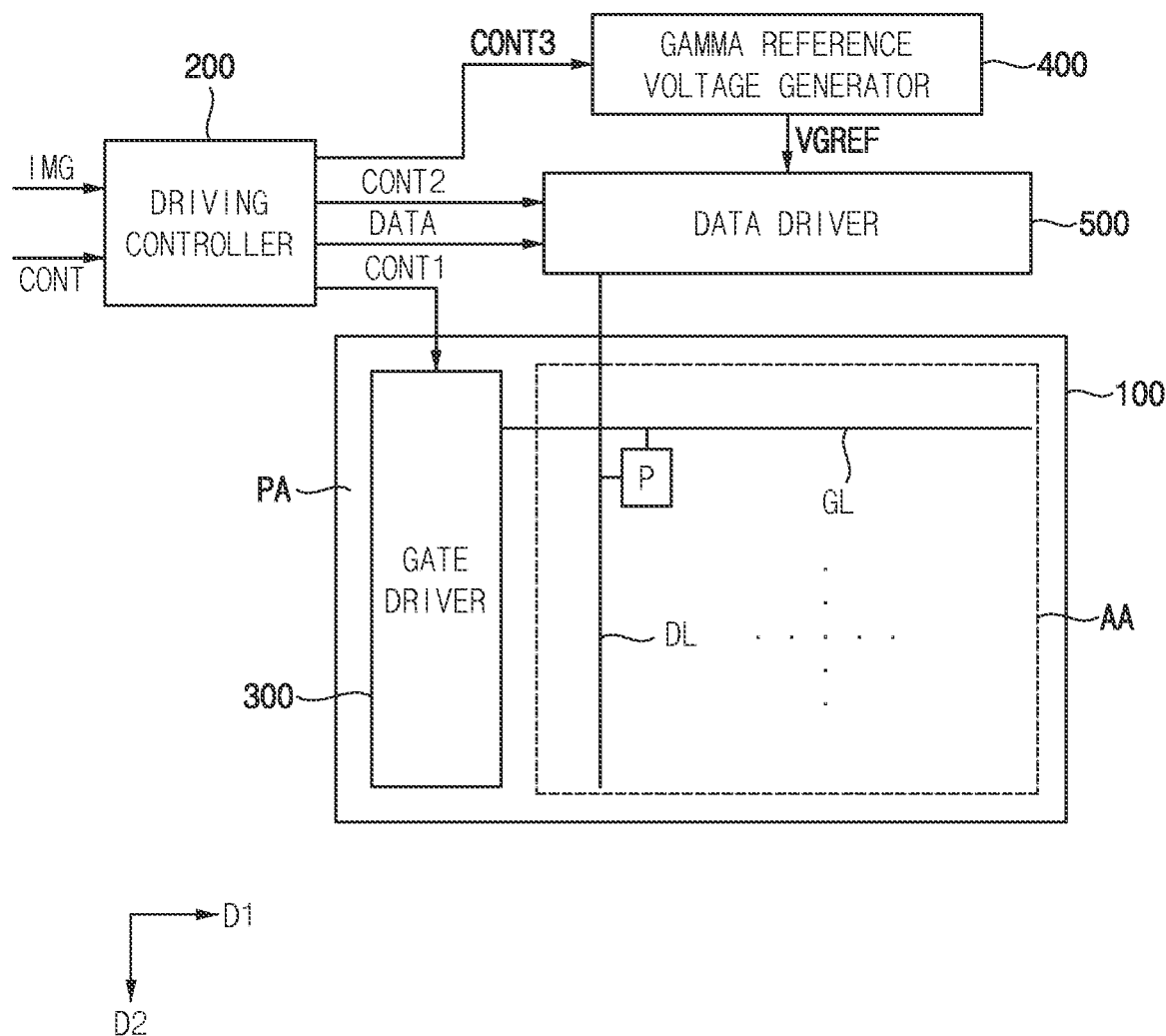
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver ("TED").

The display panel 100 includes a display region AA on which an image is displayed and a peripheral region PA adjacent to the display region AA.

The display panel 100 includes a plurality of gate lines GL, a plurality of data lines DL and a plurality of pixels connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a gate control signal CONT1, a data control signal CONT2, a gamma control signal CONT3 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may further include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

The gate driver 300 generates gate signals driving the gate lines GL in response to the gate control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
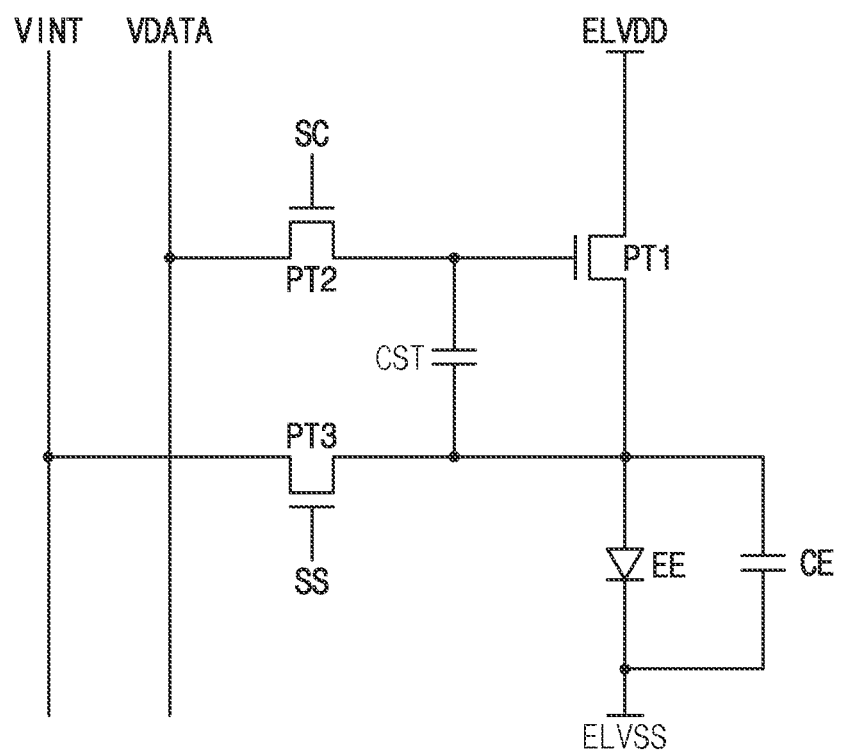
FIG. 2 is a circuit diagram illustrating a pixel of a display panel of FIG. 1.

FIG. 2 is a circuit diagram illustrating the pixel P of the display panel 100 of FIG. 1.

Referring to FIGS. 1 and 2, the pixel P may include a first pixel switching element PT1, a second pixel switching element PT2, a third pixel switching element PT3, a light emitting element EE and a storage capacitor CST.

The first pixel switching element PT1 may include a control electrode connected to the storage capacitor CST, a first electrode for receiving a high power voltage ELVDD and a second electrode connected to the light emitting element EE.

The second pixel switching element PT2 may include a control electrode for receiving a scan gate signal SC, a first electrode for receiving the data voltage VDATA and a second electrode connected to the control electrode of the first pixel switching element PT1.

The third pixel switching element PT3 may include a control electrode for receiving a sensing gate signal SS, a first electrode for receiving an initialization voltage VINT and a second electrode connected to a second electrode of the light emitting element EE.

The light emitting element EE may include a first electrode connected to the second electrode of the first pixel switching element PT1 and a second electrode for receiving a low power voltage ELVSS.

The storage capacitor CST may include a first electrode connected to the control electrode of the first pixel switching element PT1 and a second electrode connected to the second electrode of the first pixel switching element PT1.

The pixel P may further include a light emitting element capacitor CE including a first electrode connected to the first electrode of the light emitting element EE and a second electrode connected to the second electrode of the light emitting element EE. The light emitting element capacitor CE may mean an internal capacitance of the light emitting element EE.

When the scan gate signal SC is activated, the second pixel switching element PT2 is turned on so that the data voltage VDATA may be applied to the control electrode of the first pixel switching element PT1.

When the sensing gate signal SS is activated, the third pixel switching element PT3 is turned on so that the initialization voltage VINT may be applied to the second electrode of the first pixel switching element PT1.

The data voltage VDATA and the initialization voltage VINT are applied to the control electrode and the second electrode of the first pixel switching element PT1 respectively and the initialization voltage VINT has a constant level so that a luminance of the light emitting element EE may be determined by a level of the data voltage VDATA.

Figure 3:
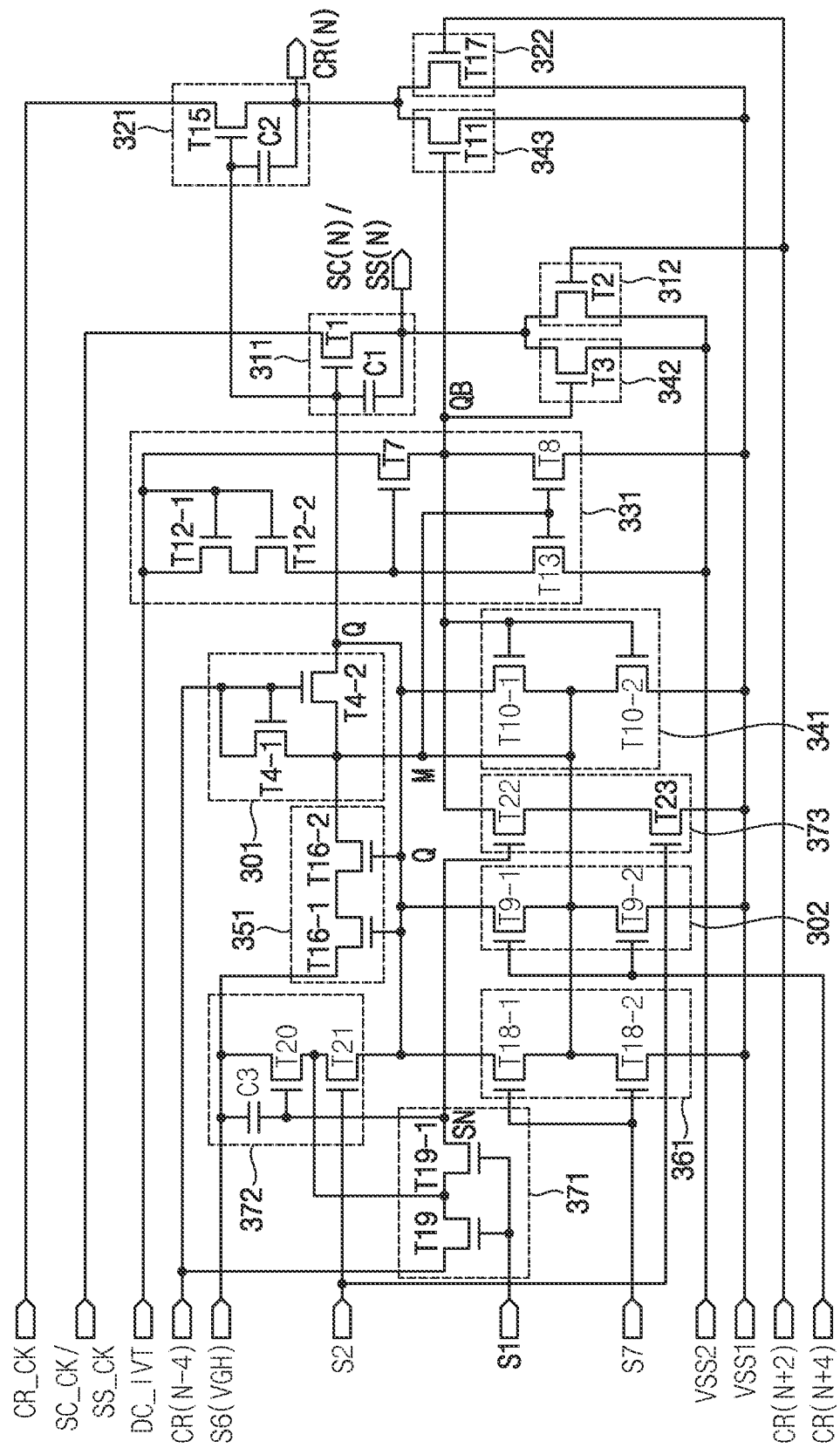
FIG. 3 is a circuit diagram illustrating a gate driving circuit of a gate driver of FIG. 1.
Figure 4:
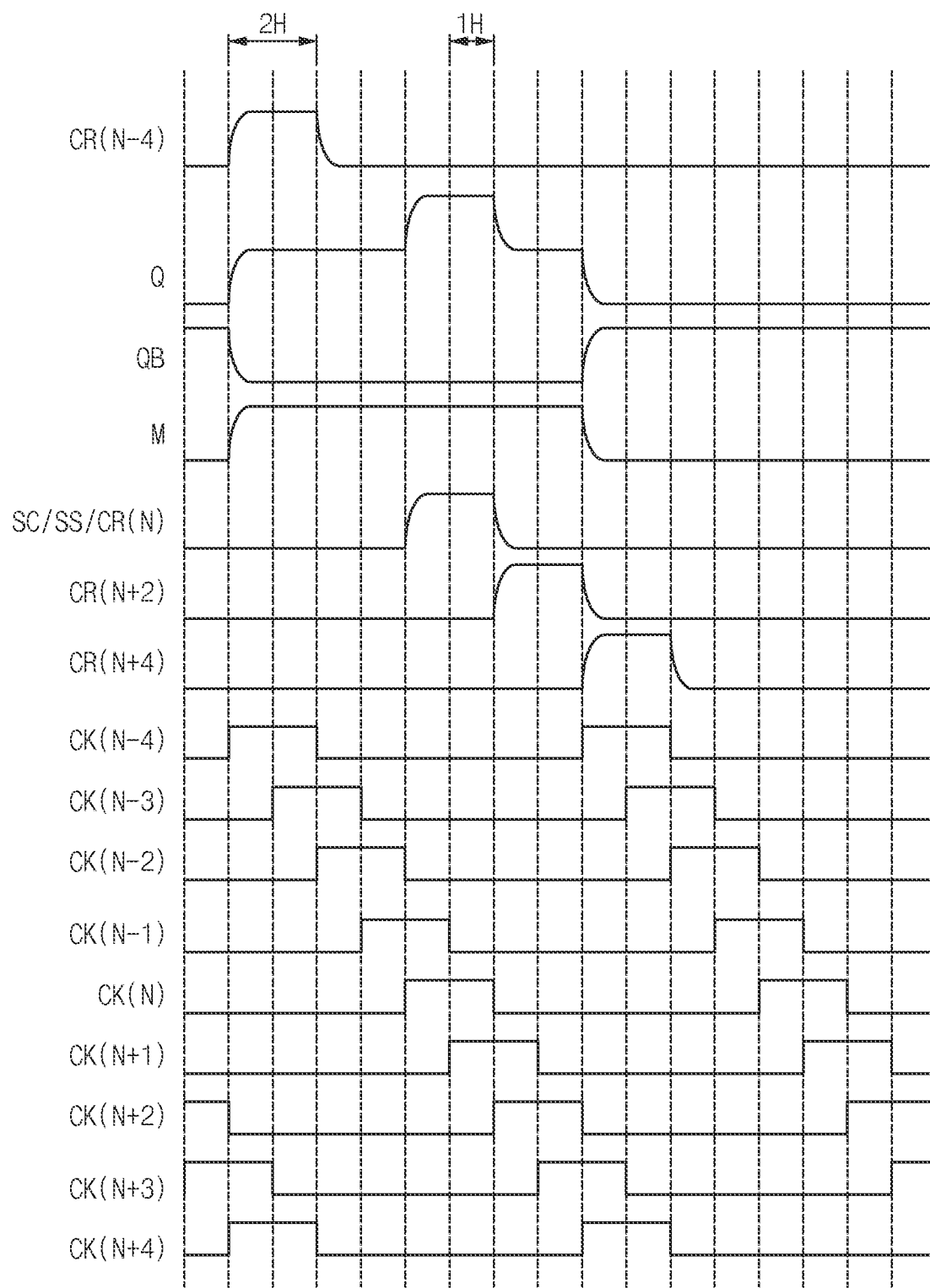
FIG. 4 is a timing diagram illustrating input signals, node signals and output signals of the gate driving circuit of FIG. 3.

FIG. 3 is a circuit diagram illustrating a gate driving circuit of the gate driver 300 of FIG. 1. FIG. 4 is a timing diagram illustrating input signals, node signals and output signals of the gate driving circuit of FIG. 3.

Referring to FIGS. 1 to 4, the gate driving circuit may include a plurality of stages. For example, a first stage of the gate driving circuit may output a gate signal corresponding to a first gate line and a second stage of the gate driving circuit may output a gate signal corresponding to a second gate line.

The gate driving circuit may include a first pull-up control circuit 301, a pull-up circuit 311, a pull-down circuit 312 and an inverting circuit 331.

The first pull-up control circuit 301 may apply a previous carry signal CR(N−4) which is one of carry signals of previous stages to a first control node Q in response to the previous carry signal CR(N−4).

For example, the first pull-up control circuit 301 may include a 4-1 switching element T4-1 including a control electrode for receiving the previous carry signal CR(N−4), a first electrode for receiving the previous carry signal CR(N−4) and a second electrode connected to a second control node M and a 4-2 switching element T4-2 including a control electrode for receiving the previous carry signal CR(N−4), a first electrode connected to the second control node M and a second electrode connected to the first control node Q.

Although the first pull-up control circuit 301 in FIG. 3 includes two switching elements T4-1 and T4-2 connected to each other in series for preventing a leakage in the present embodiment, the present invention may not be limited thereto. Alternatively, the first pull-up control circuit 301 may include one switching element or three or more switching elements connected to each other in series.

The pull-up circuit 311 may output a gate clock signal SC_CK/SS_CK as a gate output signal SC(N)/SS(N) in response to a signal of the first control node Q. Herein, SC(N) may indicate a scan gate signal of an N-th stage (a present stage), and SS(N) may indicate a sensing gate signal of the N-th stage (the present stage).

For example, the pull-up circuit 311 may include a first switching element T1 including a control electrode connected to the first control node Q, a first electrode for receiving the gate clock signal SC_CK/SS_CK and a second electrode connected to a gate output terminal and a first capacitor C1 including a first end connected to the control electrode of the first switching element T1 and a second end connected to the gate output terminal.

The pull-down circuit 312 may output a second low voltage VSS2 as the gate output signal SC(N)/SS(N) in response to a first next carry signal CR(N+2) which is one of carry signals of next stages.

For example, the pull-down circuit 312 may include a second switching element T2 including a control electrode for receiving the first next carry signal CR(N+2), a first electrode for receiving the second low voltage VSS2 and a second electrode connected to the gate output terminal.

The inverting circuit 331 may output one of a first signal DC_IVT and a first low voltage VSS1 to a third control node QB in response to the first signal DC_IVT and a signal of the second control node M.

For example, the inverting circuit 331 may include a 12-1 switching element T12-1 including a control electrode for receiving the first signal DC_IVT, a first electrode for receiving the first signal DC_IVT and a second electrode connected to a twelfth intermediate node, a 12-2 switching element T12-2 including a control electrode for receiving the first signal DC_IVT, a first electrode connected to the twelfth intermediate node and a second electrode connected to a control electrode of a seventh switching element T7, the seventh switching element T7 including the control electrode connected to the second electrode of the 12-2 switching element T12-2, a first electrode for receiving the first signal DC_IVT and a second electrode connected to the third control node QB, a thirteenth switching element T13 including a control electrode connected to the second control node M, a first electrode connected to the control electrode of the seventh switching element T7 and a second electrode for receiving the second low voltage VSS2 and an eighth switching element T8 including a control electrode connected to the second control node M, a first electrode connected to the third control node QB and a second electrode for receiving the first low voltage VSS1.

Although the inverting circuit 331 includes two switching elements T12-1 and T12-2 connected to each other in series for preventing a leakage in the present embodiment, the present invention may not be limited thereto. Alternatively, the inverting circuit 331 may include one switching element instead of the two switching elements T12-1 and T12-2 or three or more switching elements connected to each other in series instead of the two switching elements T12-1 and T12-2.

As explained above, in the present embodiment, the control node (the first control node Q) of the pull-up circuit 311 and the control node (the second control node M) of the inverting circuit 331 may be separated. A maximum voltage of the second control node M may be less than a maximum voltage of the first control node Q. Thus, a positive bias temperature stress applied to the eighth switching element T8 and the thirteenth switching element T13 in the inverting circuit 331 may be reduced so that a degree of a shift of threshold voltages of the eighth switching element T8 and the thirteenth switching element T13 in the inverting circuit may be reduced.

In the present embodiment, the first signal may be a direct-current inverter voltage DC_IVT. The direct-current inverter voltage DC_IVT may be less than a gate high voltage VGH defining a high level of the gate output signal. The direct-current inverter voltage DC_IVT may be greater than each of the first low voltage VSS1 and the second low voltage VSS2. The second low voltage VSS2 may be greater than the first low voltage VSS1.

The gate driving circuit may further include an inverting control circuit 351 for applying the gate high voltage VGH defining the high level of the gate output signal SC(N)/SS(N) to the second control node M in response to the signal of the first control node Q. Herein, the gate high voltage VGH may be referred to as a sixth sensing signal S6.

For example, the inverting control circuit 351 may include a 16-1 switching element T16-1 including a control electrode connected to the first control node Q, a first electrode for receiving the gate high voltage VGH and a second electrode connected to a sixteenth intermediate node and a 16-2 switching element T16-2 including a control electrode connected to the first control node Q, a first electrode connected to the sixteenth intermediate node and a second electrode connected to the second control node M.

Although the inverting control circuit 351 includes two switching elements T16-1 and T16-2 connected to each other in series for preventing a leakage in the present embodiment, the present invention may not be limited thereto. Alternatively, the inverting control circuit 351 may include one switching element or three or more switching elements connected to each other in series.

The gate driving circuit may further include a second pull-up control circuit 302 for applying the first low voltage VSS1 to the first control node Q in response to a second next carry signal CR(N+4) which is one of the carry signals of the next stages.

For example, the second pull-up control circuit 302 may include a 9-1 switching element including a control electrode for receiving the second next carry signal CR(N+4), a first electrode connected to the first control node Q and a second electrode connected to a ninth intermediate node and a 9-2 switching element including a control electrode for receiving the second next carry signal CR(N+4), a first electrode connected to the ninth intermediate node and a second electrode for receiving the first low voltage VSS1.

Although the second pull-up control circuit 302 includes two switching elements T9-1 and T9-2 connected to each other in series for preventing a leakage in the present embodiment, the present invention may not be limited thereto. Alternatively, the second pull-up control circuit 302 may include one switching element or three or more switching elements connected to each other in series.

The gate driving circuit may further include a first holding circuit 341 for applying the first low voltage VSS1 to the first control node Q in response to the signal of the third control node QB.

For example, the first holding circuit 341 may include a 10-1 switching element T10-1 including a control electrode connected to the third control node QB, a first electrode connected to the first control node Q and a second electrode connected to a tenth intermediate node and a 10-2 switching element T10-2 including a control electrode connected to the third control node QB, a first electrode connected to the tenth intermediate node and a second electrode for receiving the first low voltage VSS1.

Although the first holding circuit 341 includes two switching elements T10-1 and T10-2 connected to each other in series for preventing a leakage in the present embodiment, the present invention may not be limited thereto. Alternatively, the first holding circuit 341 may include one switching element or three or more switching elements connected to each other in series.

The gate driving circuit may further include a second holding circuit 342 for outputting the second low voltage VSS2 as the gate output signal in response to the signal of the third control node QB.

For example, the second holding circuit 342 may include a third switching element T3 including a control electrode connected to the third control node QB, a first electrode for receiving the second low voltage VSS2 and a second electrode connected to the gate output terminal.

The gate driving circuit may further include a carry pull-up circuit 321 for outputting a carry clock signal CR_CK as a carry signal CR(N) in response to the signal of the first control node Q and a carry pull-down circuit 322 for outputting the first low voltage VSS1 as the carry signal CR(N) in response to the first next carry signal CR(N+2).

For example, the carry pull-up circuit 321 may include a fifteenth switching element T15 including a control electrode connected to the first control node Q, a first electrode for applying the carry clock signal CR_CK and a second electrode connected to a carry output terminal and a second capacitor C2 including a first end connected to the control electrode of the fifteenth switching element T15 and a second end connected to the carry output terminal.

For example, the carry pull-down circuit 322 may include a seventeenth switching element T17 including a control electrode for receiving the first next carry signal CR(N+2), a first electrode for applying the first low voltage VSS1 and a second electrode connected to the carry output terminal.

The gate driving circuit may further include a third holding circuit 343 for outputting the first low voltage VSS1 as the carry signal CR(N) in response to the signal of the third control node QB.

For example, the third holding circuit 343 may include an eleventh switching element T11 including a control electrode connected to the third control node QB, a first electrode for receiving the first low voltage VSS1 and a second electrode connected to the carry output terminal.

The gate driving circuit may further include a reset circuit 361 for applying the first low voltage VSS1 to the first control node Q in response to a reset signal S7.

For example, the reset circuit 361 may include an 18-1 switching element T18-1 including a control electrode for receiving the reset signal S7, a first electrode connected to the first control node Q and a second electrode connected to an eighteenth intermediate node and an 18-2 switching element T18-2 including a control electrode for receiving the reset signal S7, a first electrode connected to the eighteenth intermediate node and a second electrode for receiving the first low voltage VSS1.

Although the reset circuit 361 includes two switching elements T18-1 and T18-2 connected to each other in series for preventing a leakage in the present embodiment, the present invention may not be limited thereto. Alternatively, the reset circuit 361 may include one switching element or three or more switching elements connected to each other in series.

For example, the reset signal S7 may have an active pulse at a beginning of a display period. For example, the reset signal S7 may be the vertical start signal. When the reset signal S7 has an active level at the beginning of the display period, the first control node Q may be reset to the first low voltage VSS by the reset circuit 361.

The gate driving circuit may further include a sensing selecting circuit 371 for applying the previous carry signal CR(N-4) to a sensing control node SN in response to a first sensing signal S1.

For example, the sensing selecting circuit 371 may include an 19-1 switching element T19-1 including a control electrode for receiving the first sensing signal S1, a first electrode for receiving the previous carry signal CR(N-4) and a second electrode connected to a nineteenth intermediate node and an 19-2 switching element T19-2 including a control electrode for receiving the first sensing signal S1, a first electrode connected to the nineteenth intermediate node and a second electrode connected to the sensing control node SN.

Although the sensing selecting circuit 371 includes two switching elements T19-1 and T19-2 connected to each other in series for preventing a leakage in the present embodiment, the present invention may not be limited thereto. Alternatively, the sensing selecting circuit 371 may include one switching element or three or more switching elements connected to each other in series.

The gate driving circuit may further include a first sensing control circuit 372 for applying the gate high voltage VGH to the first control node Q in response to the signal of the sensing control node SN and a second sensing signal S2 and a second sensing control circuit 373 for applying the first low voltage VSS1 to the third control node QB in response to the signal of the sensing control node SN and the second sensing signal S2.

For example, the first sensing control circuit 372 may include a twentieth switching element T20 including a control electrode connected to the sensing control node SN, a first electrode for receiving the gate high voltage VGH and a second electrode connected to a first sensing intermediate node and a twenty first switching element T21 including a control electrode for receiving the second sensing signal S2, a first electrode connected to the first sensing intermediate node and a second electrode connected to the first control node Q.

For example, the first sensing control circuit 372 may further include a third capacitor C3 including a first end for receiving the gate high voltage VGH and a second end connected to the sensing control node SN.

For example, the first sensing intermediate node may be a node between the twentieth switching element T20 and the twenty first switching element T21. The first sensing intermediate node may be connected to the nineteenth intermediate node.

For example, the second sensing control circuit 373 may include a twenty second switching element T22 including a control electrode connected to the sensing control node SN, a first electrode connected to the third control node QB and a second electrode connected to a second sensing intermediate node and a twenty third switching element T23 including a control electrode for receiving the second sensing signal S2, a first electrode connected to the second sensing intermediate node and a second electrode for receiving the first low voltage VSS1.

For example, the second sensing intermediate node may be a node between the twentieth second element T22 and the twenty third switching element T23.

The first sensing signal S1 may have an active pulse in the display period. A gate line which is a sensing target may be selected by the first sensing signal S1.

When the stage is selected by the first sensing signal S1, the third capacitor C3 may store a voltage of a high level.

The second sensing signal S2 may have an active pulse at a beginning of a blank period. When the second sensing signal S2 has an active level, the gate signal may be applied to the sensing target gate line selected by the first sensing signal S1.

In the present embodiment, clock signals CK(N-4) to CK(N+3) having eight different phases may be applied to the stages. In FIG. 4, CK(N+4) is shown for convenience of explanation and means the signal same as CK(N-4).

In FIG. 4, the clock signal CK(N-4) to CK(N+3) may be one of the scan clock signal SC_CK, the sensing clock signal SS_CK and the carry clock signal CR_CK.

In the present embodiment, the clock signal CK(N-4) to CK(N+3) may have a high level for two horizontal periods 2H. Accordingly, the scan gate signal SC(N), the sensing gate signal SS(N) and the carry signal CR(N) may have a high level for two horizontal periods 2H.

The signal of the first control node Q may have a low level, a first high level (e.g., VGH) and a second high level (e.g., equal to or greater than 2VGH: two times of VGH) higher than the first high level. The signal of the second control node M may have a low level and a high level (e.g., VGH). In addition, the signal of the third control node QB may have a low level in a period when the signal of the first control node Q has the first high level or the second high level, and the signal of the third control node QB may have a high level in a period when the signal of the first control node Q has the low level.

Figure 5:
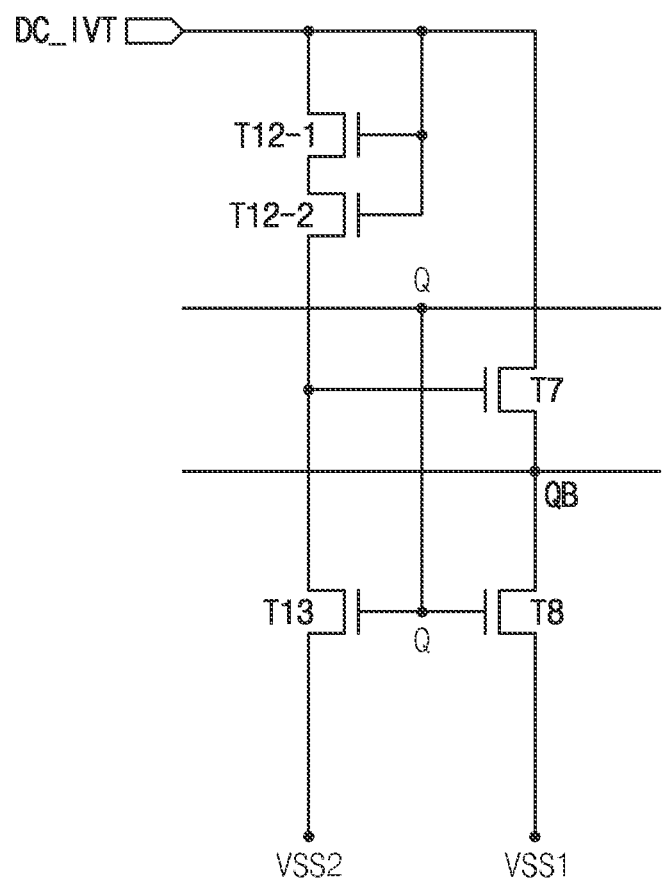
FIG. 5 is a circuit diagram illustrating an inverting circuit according to a comparative embodiment.
Figure 6:
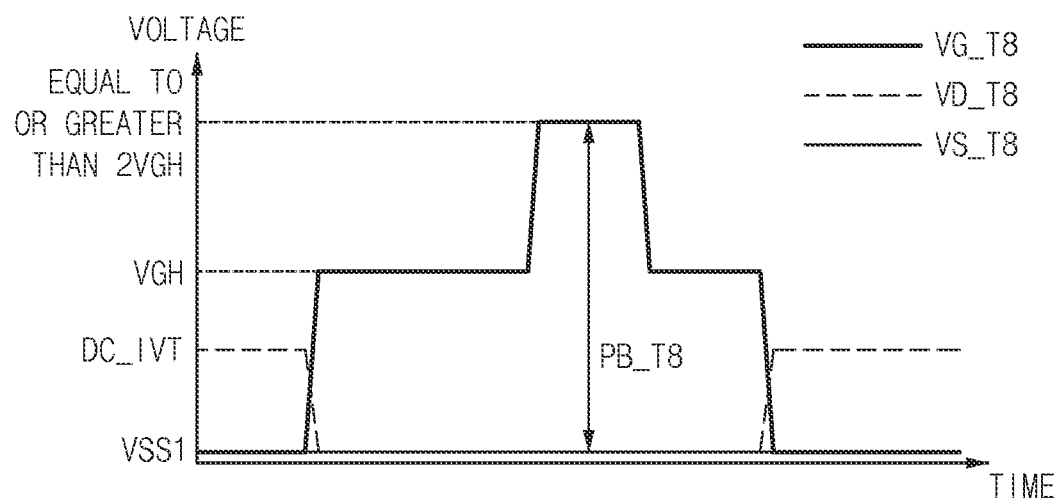
FIG. 6 is a timing diagram illustrating a signal of an eighth switching element of the inverting circuit of the comparative embodiment.
Figure 7:
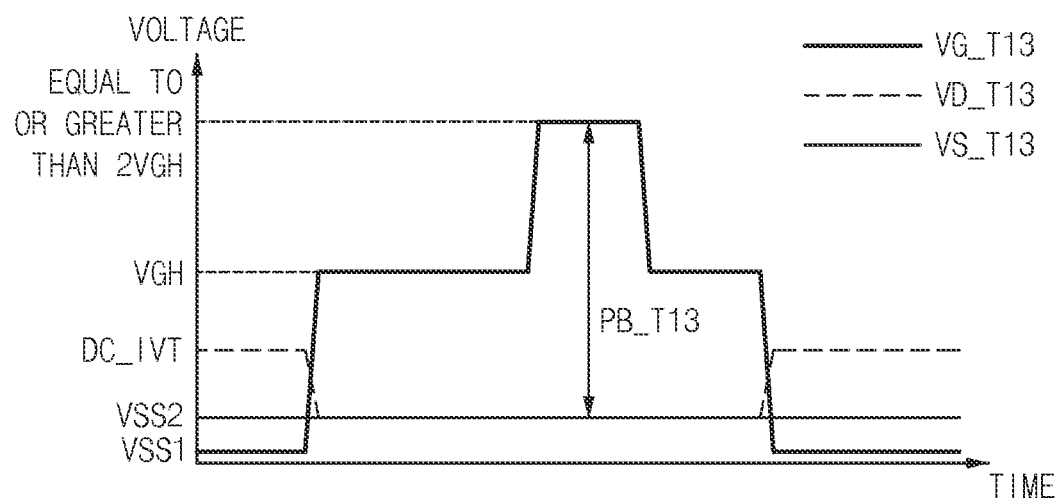
FIG. 7 is a timing diagram illustrating a signal of a thirteenth switching element of the inverting circuit of the comparative embodiment.
Figure 8:
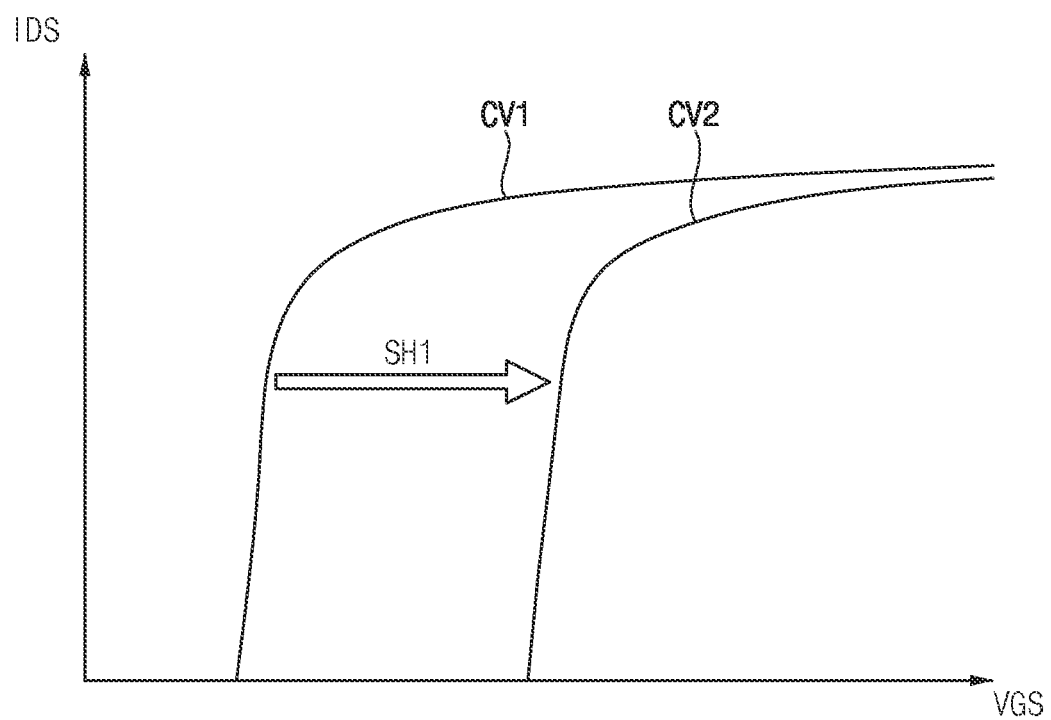
FIG. 8 is a graph illustrating a shift of threshold voltages of the eighth switching element and the thirteenth switching element of the inverting circuit of the comparative embodiment.

FIG. 5 is a circuit diagram illustrating an inverting circuit according to a comparative embodiment. FIG. 6 is a timing diagram illustrating a signal of an eighth switching element T8 of the inverting circuit of the comparative embodiment. FIG. 7 is a timing diagram illustrating a signal of a thirteenth switching element T13 of the inverting circuit of the comparative embodiment. FIG. 8 is a graph illustrating a shift of threshold voltages of the eighth switching element T8 and the thirteenth switching element T13 of the inverting circuit of the comparative embodiment.

In the comparative embodiment of FIG. 5, the control electrode of the eighth switching element T8 and the control electrode of the thirteenth switching element T13 may be connected to the first control node Q. In other words, in the comparative embodiment of FIG. 5, the control node Q of the pull-up circuit and the control node Q of the inverting circuit may not be separated.

In FIG. 6, VG_T8 indicates a gate voltage of the eighth switching element T8, VD_T8 indicates a drain voltage of the eighth switching element T8 and VS_T8 indicates a source voltage of the eighth switching element T8.

As shown in FIG. 6, the gate voltage VG_T8 of the eighth switching element T8 rises to the second high level (equal to or greater than 2VGH) of the first control node Q so that a difference PB_T8 between the gate voltage VG_T8 of the eighth switching element T8 and the source voltage VS_T8 of the eighth switching element T8 may be equal to or greater than 2VGH-VSS1.

In FIG. 7, VG_T13 indicates a gate voltage of the thirteenth switching element T13, VD_T13 indicates a drain voltage of the thirteenth switching element T13 and VS_T13 indicates a source voltage of the thirteenth switching element T13.

As shown in FIG. 7, the gate voltage VG_T13 of the thirteenth switching element T13 rises to the second high level (equal to or greater than 2VGH) of the first control node Q so that a difference PB_T13 between the gate voltage VG_T13 of the thirteenth switching element T13 and the source voltage VS_T13 of the thirteenth switching element T13 may be equal to or greater than 2VGH-VSS2.

As explained above, the positive bias temperature stress applied to the eighth switching element T8 and the thirteenth switching element T13 in the inverting circuit is very great in FIGS. 6 and 7, so that the degree (SH1 in FIG. 8) of the shift of the threshold voltages of the eighth switching element T8 and the thirteenth switching element T13 in the inverting circuit may be great.

Due to the shift of the threshold voltage of the eighth switching element T8 and the thirteenth switching element T13, the inverting circuit may not normally operate. When the inverting circuit does not normally operate, the gate driver may not generate a normal gate signal so that the display apparatus may not normally operate.

Figure 9:
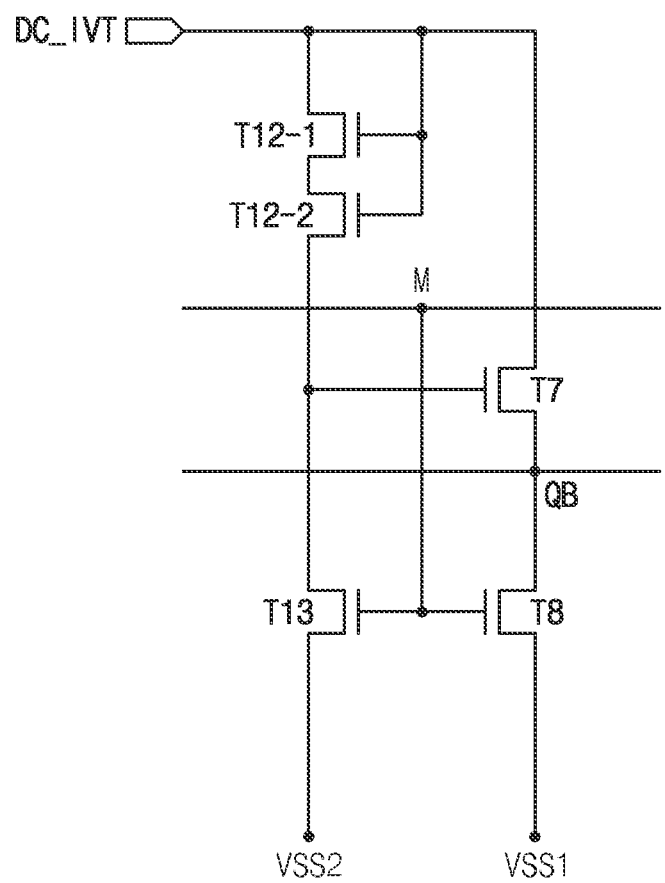
FIG. 9 is a circuit diagram illustrating an inverting circuit of FIG. 3.
Figure 10:
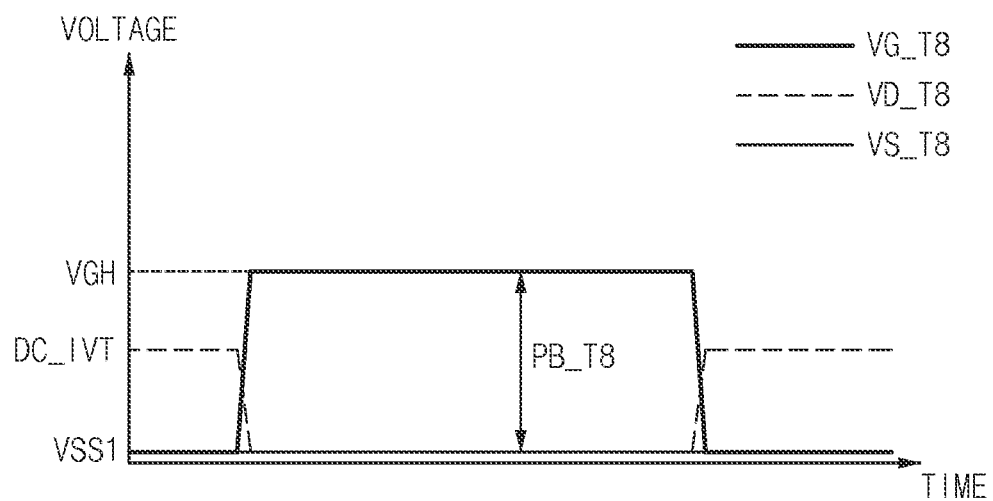
FIG. 10 is a timing diagram illustrating a signal of an eighth switching element of the inverting circuit of FIG. 3.
Figure 11:
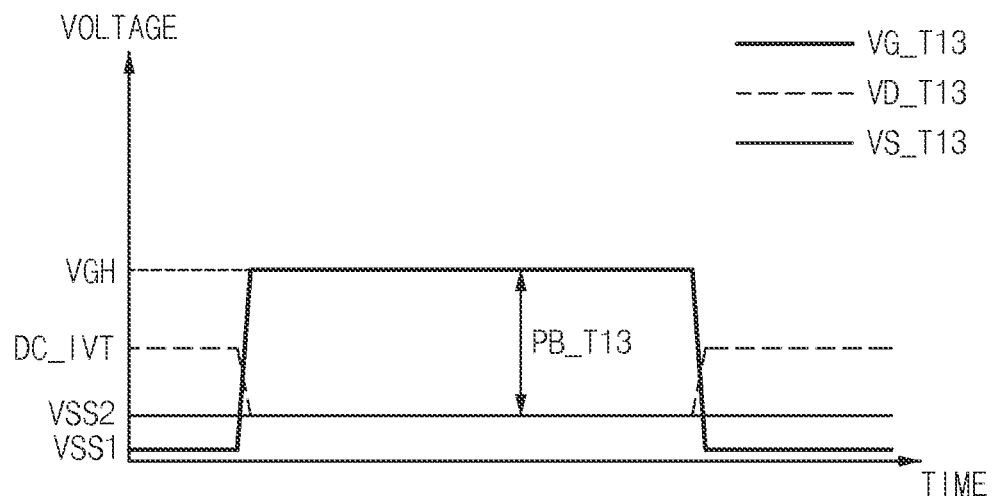
FIG. 11 is a timing diagram illustrating a signal of a thirteenth switching element of the inverting circuit of FIG. 3.
Figure 12:
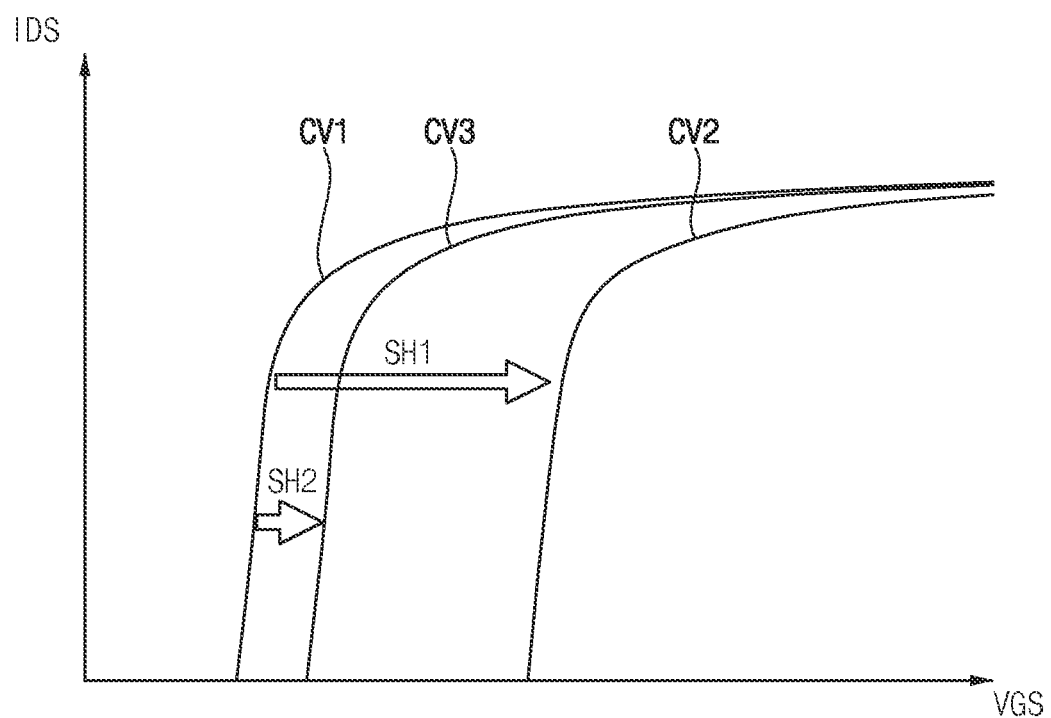
FIG. 12 is a graph illustrating a shift of threshold voltages of the eighth switching element and the thirteenth switching element of the inverting circuit of FIG. 3.

FIG. 9 is a circuit diagram illustrating the inverting circuit 331 of FIG. 3. FIG. 10 is a timing diagram illustrating a signal of the eighth switching element T8 of the inverting circuit 331 of FIG. 3. FIG. 11 is a timing diagram illustrating a signal of the thirteenth switching element T13 of the inverting circuit 331 of FIG. 3. FIG. 12 is a graph illustrating a shift of threshold voltages of the eighth switching element T8 and the thirteenth switching element T13 of the inverting circuit 331 of FIG. 3.

In the present embodiment, the control electrode of the eighth switching element T8 and the control electrode of the thirteenth switching element T13 may not be connected to the first control node Q but the second control node M. In other words, in the present embodiment, the control node Q of the pull-up circuit 311 and the control node M of the inverting circuit 331 may be separated.

In FIG. 10, VG_T8 indicates a gate voltage of the eighth switching element T8, VD_T8 indicates a drain voltage of the eighth switching element T8 and VS_T8 indicates a source voltage of the eighth switching element T8.

As shown in FIG. 10, the gate voltage VG_T8 of the eighth switching element T8 rises only to the high level VGH of the second control node M so that a difference PB_T8 between the gate voltage VG_T8 of the eighth switching element T8 and the source voltage VS_T8 of the eighth switching element T8 may be VGH-VSS1.

In FIG. 11, VG_T13 indicates a gate voltage of the thirteenth switching element T13, VD_T13 indicates a drain voltage of the thirteenth switching element T13 and VS_T13 indicates a source voltage of the thirteenth switching element T13.

As shown in FIG. 11, the gate voltage VG_T13 of the thirteenth switching element T13 rises to the high level VGH of the second control node M so that a difference PB_T13 between the gate voltage VG_T13 of the thirteenth switching element T13 and the source voltage VS_T13 of the thirteenth switching element T13 may be VGH-VSS2.

As explained above, in FIGS. 10 and 11 the positive bias temperature stress applied to the eighth switching element T8 and the thirteenth switching element T13 in the inverting circuit 331 may be reduced compared to the comparative embodiment explained in FIGS. 6 and 7, so that the degree (SH2 in FIG. 12) of the shift of the threshold voltages of the eighth switching element T8 and the thirteenth switching element T13 in the inverting circuit 331 may be reduced compared to the degree (SH1 in FIG. 8) of the shift of the threshold voltages in the comparative embodiment explained in FIGS. 6 and 7.

According to the present embodiment, the control node Q of the pull-up circuit 311 and the control node M of the inverting circuit 331 may be separated. A maximum voltage of the control node M of the inverting circuit 331 may be less than a maximum voltage of the control node Q of the pull-up circuit 311. Thus, a positive bias temperature stress applied to the eighth switching element T8 and the thirteenth switching element T13 in the inverting circuit 331 may be reduced so that the degree of the shift of the threshold voltages of the eighth switching element T8 and the thirteenth switching element T13 in the inverting circuit 331 may be reduced.

When the degree of the shift of the threshold voltages of the switching elements T8 and T13 in the inverting circuit 331 is reduced, the reliability of the gate driving circuit may be effectively enhanced and the lifetime of the gate driving circuit may be effectively increased.

Figure 13:
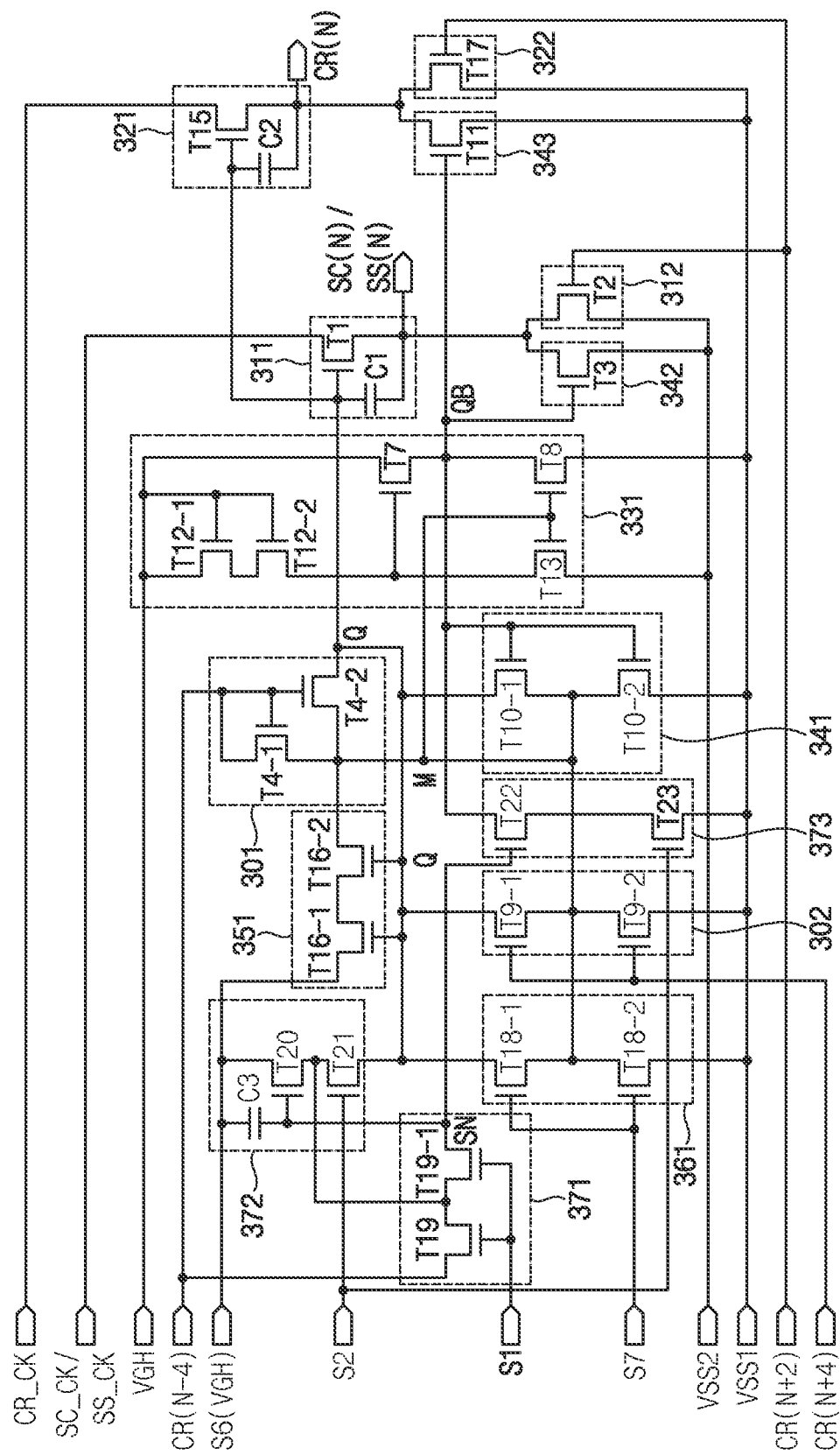
FIG. 13 is a circuit diagram illustrating a gate driving circuit of a gate driver of a display apparatus according to another embodiment of the present invention.

FIG. 13 is a circuit diagram illustrating a gate driving circuit of a gate driver of a display apparatus according to another embodiment of the present invention.

The gate driver and the display apparatus according to the present embodiment are substantially the same as the gate driver and the display apparatus of the previous embodiment explained referring to FIGS. 1 to 4 and 9 to 12 except for the first signal applied to the inverting circuit. Thus, the same reference numerals will be used to refer to the same or like parts as those described in the previous embodiment of FIGS. 1 to 4 and 9 to 12 and any repetitive explanation concerning the above elements will be omitted.

Referring to FIGS. 1, 2 and 9 to 13, the display apparatus includes a display panel 100 and a display panel driver. The display panel driver includes a driving controller 200, a gate driver 300, a gamma reference voltage generator 400 and a data driver 500.

The gate driving circuit may include a plurality of stages. For example, a first stage of the gate driving circuit may output a gate signal corresponding to a first gate line and a second stage of the gate driving circuit may output a gate signal corresponding to a second gate line.

The gate driving circuit may include a first pull-up control circuit 301, a pull-up circuit 311, a pull-down circuit 312 and an inverting circuit 331.

The first pull-up control circuit 301 may apply a previous carry signal CR(N−4) which is one of carry signals of previous stages to a first control node Q in response to the previous carry signal CR(N−4).

The pull-up circuit 311 may output a gate clock signal SC_CK/SS_CK as a gate output signal SC(N)/SS(N) in response to a signal of the first control node Q. Herein, SC(N) may indicate a scan gate signal of an N-th stage (a present stage) and SS(N) may indicate a sensing gate signal of the N-th stage (the present stage).

The pull-down circuit 312 may output a second low voltage VSS2 as the gate output signal SC(N)/SS(N) in response to a first next carry signal CR(N+2) which is one of carry signals of next stages.

The inverting circuit 331 may output one of a first signal VGH and a first low voltage VSS1 to a third control node QB in response to the first signal VGH and a signal of the second control node M.

For example, the inverting circuit 331 may include a 12-1 switching element T12-1 including a control electrode for receiving the first signal VGH, a first electrode for receiving the first signal VGH and a second electrode connected to a twelfth intermediate node, a 12-2 switching element T12-2 including a control electrode for receiving the first signal VGH, a first electrode connected to the twelfth intermediate node and a second electrode connected to a control electrode of a seventh switching element T7, the seventh switching element T7 including the control electrode connected to the second electrode of the 12-2 switching element T12-2, a first electrode for receiving the first signal VGH and a second electrode connected to the third control node QB, a thirteenth switching element T13 including a control electrode connected to the second control node M, a first electrode connected to the control electrode of the seventh switching element T7 and a second electrode for receiving the second low voltage VSS2 and an eighth switching element T8 including a control electrode connected to the second control node M, a first electrode connected to the third control node QB and a second electrode for receiving the first low voltage VSS1.

Although the inverting circuit 331 includes two switching elements T12-1 and T12-2 connected to each other in series for preventing a leakage in the present embodiment, the present invention may not be limited thereto. Alternatively, the inverting circuit 331 may include one switching element instead of the two switching elements T12-1 and T12-2 or three or more switching elements connected to each other in series instead of the two switching elements T12-1 and T12-2.

As explained above, in the present embodiment, the control node (the first control node Q) of the pull-up circuit 311 and the control node (the second control node M) of the inverting circuit 331 may be separated. A maximum voltage of the second control node M may be less than a maximum voltage of the first control node Q. Thus, a positive bias temperature stress applied to the eighth switching element T8 and the thirteenth switching element T13 in the inverting circuit 331 may be reduced so that a degree of a shift of threshold voltages of the eighth switching element T8 and the thirteenth switching element T13 in the inverting circuit may be reduced.

In the present embodiment, the first signal may be a gate high voltage VGH defining a high level of the gate output signal.

According to the present embodiment, the control node Q of the pull-up circuit 311 and the control node M of the inverting circuit 331 may be separated. A maximum voltage of the control node M of the inverting circuit 331 may be less than a maximum voltage of the control node Q of the pull-up circuit 311. Thus, a positive bias temperature stress applied to the eighth switching element T8 and the thirteenth switching element T13 in the inverting circuit 331 may be reduced so that the degree of the shift of the threshold voltages of the eighth switching element T8 and the thirteenth switching element T13 in the inverting circuit 331 may be reduced.

When the degree of the shift of the threshold voltages of the switching elements T8 and T13 in the inverting circuit 331 is reduced, the reliability of the gate driving circuit may be effectively enhanced and the lifetime of the gate driving circuit may be effectively increased.

Figure 14:
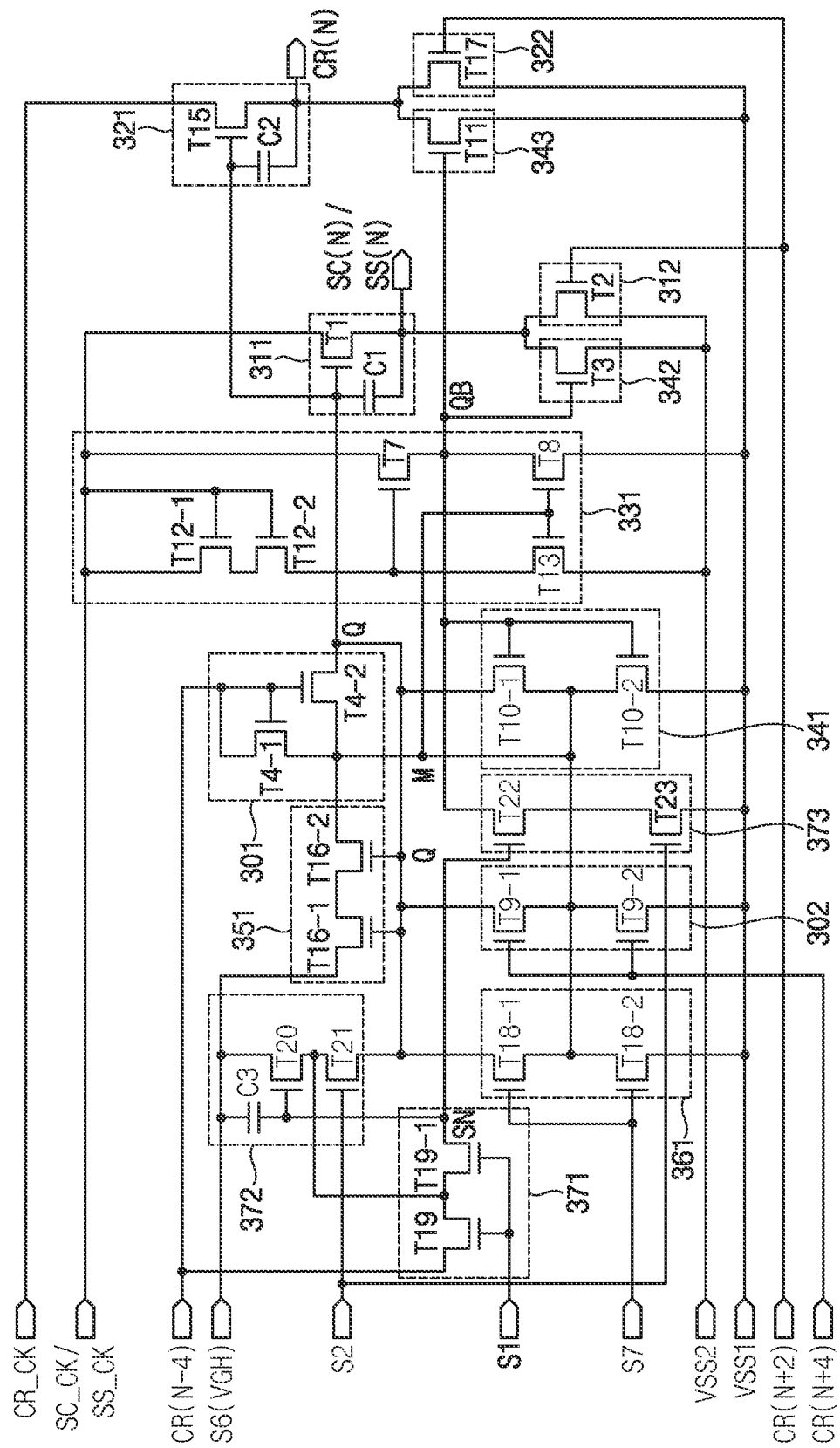
FIG. 14 is a circuit diagram illustrating a gate driving circuit of a gate driver of a display apparatus according to still another embodiment of the present invention.

FIG. 14 is a circuit diagram illustrating a gate driving circuit of a gate driver 300 of a display apparatus according to still another embodiment of the present invention.

The gate driver and the display apparatus according to the present embodiment are substantially the same as the gate driver and the display apparatus of the previous embodiment explained referring to FIGS. 1 to 4 and 9 to 12 except for the first signal applied to the inverting circuit. Thus, the same reference numerals will be used to refer to the same or like parts as those described in the previous embodiment of FIGS. 1 to 4 and 9 to 12 and any repetitive explanation concerning the above elements will be omitted.

Referring to FIGS. 1, 2 and 9 to 12 and 14, the display apparatus includes a display panel 100 and a display panel driver. The display panel driver includes a driving controller 200, a gate driver 300, a gamma reference voltage generator 400 and a data driver 500.

The gate driving circuit may include a plurality of stages. For example, a first stage of the gate driving circuit may output a gate signal corresponding to a first gate line and a second stage of the gate driving circuit may output a gate signal corresponding to a second gate line.

The gate driving circuit may include a first pull-up control circuit 301, a pull-up circuit 311, a pull-down circuit 312 and an inverting circuit 331.

The first pull-up control circuit 301 may apply a previous carry signal CR(N−4) which is one of carry signals of previous stages to a first control node Q in response to the previous carry signal CR(N−4).

The pull-up circuit 311 may output a gate clock signal SC_CK/SS_CK as a gate output signal SC(N)/SS(N) in response to a signal of the first control node Q. Herein, SC(N) may indicate a scan gate signal of an N-th stage (a present stage) and SS(N) may indicate a sensing gate signal of the N-th stage (the present stage).

The pull-down circuit 312 may output a second low voltage VSS2 as the gate output signal SC(N)/SS(N) in response to a first next carry signal CR(N+2) which is one of carry signals of next stages.

The inverting circuit 331 may output one of a first signal SC_CK/SS_CK and a first low voltage VSS1 to a third control node QB in response to the first signal SC_CK/SS_CK and a signal of the second control node M.

For example, the inverting circuit 331 may include a 12-1 switching element T12-1 including a control electrode for receiving the first signal SC_CK/SS_CK, a first electrode for receiving the first signal SC_CK/SS_CK and a second electrode connected to a twelfth intermediate node, a 12-2 switching element T12-2 including a control electrode for receiving the first signal SC_CK/SS_CK, a first electrode connected to the twelfth intermediate node and a second electrode connected to a control electrode of a seventh switching element T7, the seventh switching element T7 including the control electrode connected to the second electrode of the 12-2 switching element T12-2, a first electrode for receiving the first signal SC_CK/SS_CK and a second electrode connected to the third control node QB, a thirteenth switching element T13 including a control electrode connected to the second control node M, a first electrode connected to the control electrode of the seventh switching element T7 and a second electrode for receiving the second low voltage VSS2 and an eighth switching element T8 including a control electrode connected to the second control node M, a first electrode connected to the third control node QB and a second electrode for receiving the first low voltage VSS1.

Although the inverting circuit 331 includes two switching elements T12-1 and T12-2 connected to each other in series for preventing a leakage in the present embodiment, the present invention may not be limited thereto. Alternatively, the inverting circuit 331 may include one switching element instead of the two switching elements T12-1 and T12-2 or three or more switching elements connected to each other in series instead of the two switching elements T12-1 and T12-2.

As explained above, in the present embodiment, the control node (the first control node Q) of the pull-up circuit 311 and the control node (the second control node M) of the inverting circuit 331 may be separated. A maximum voltage of the second control node M may be less than a maximum voltage of the first control node Q. Thus, a positive bias temperature stress applied to the eighth switching element T8 and the thirteenth switching element T13 in the inverting circuit 331 may be reduced so that a degree of a shift of threshold voltages of the eighth switching element T8 and the thirteenth switching element T13 in the inverting circuit may be reduced.

In the present embodiment, the first signal may be a gate clock signal SC_CK/SS_CK. In the present embodiment, the inverting circuit 331 may be an AC inverter. Although the first signal is the gate clock signal SC_CK/SS_CK in the present embodiment, the present invention may not be limited thereto. Alternatively, the first signal may be a carry clock signal CR_CK.

According to the present embodiment, the control node Q of the pull-up circuit 311 and the control node M of the inverting circuit 331 may be separated. A maximum voltage of the control node M of the inverting circuit 331 may be less than a maximum voltage of the control node Q of the pull-up circuit 311. Thus, a positive bias temperature stress applied to the eighth switching element T8 and the thirteenth switching element T13 in the inverting circuit 331 may be reduced so that the degree of the shift of the threshold voltages of the eighth switching element T8 and the thirteenth switching element T13 in the inverting circuit 331 may be reduced.

When the degree of the shift of the threshold voltages of the switching elements T8 and T13 in the inverting circuit 331 is reduced, the reliability of the gate driving circuit may be effectively enhanced and the lifetime of the gate driving circuit may be effectively increased.

Figure 15:
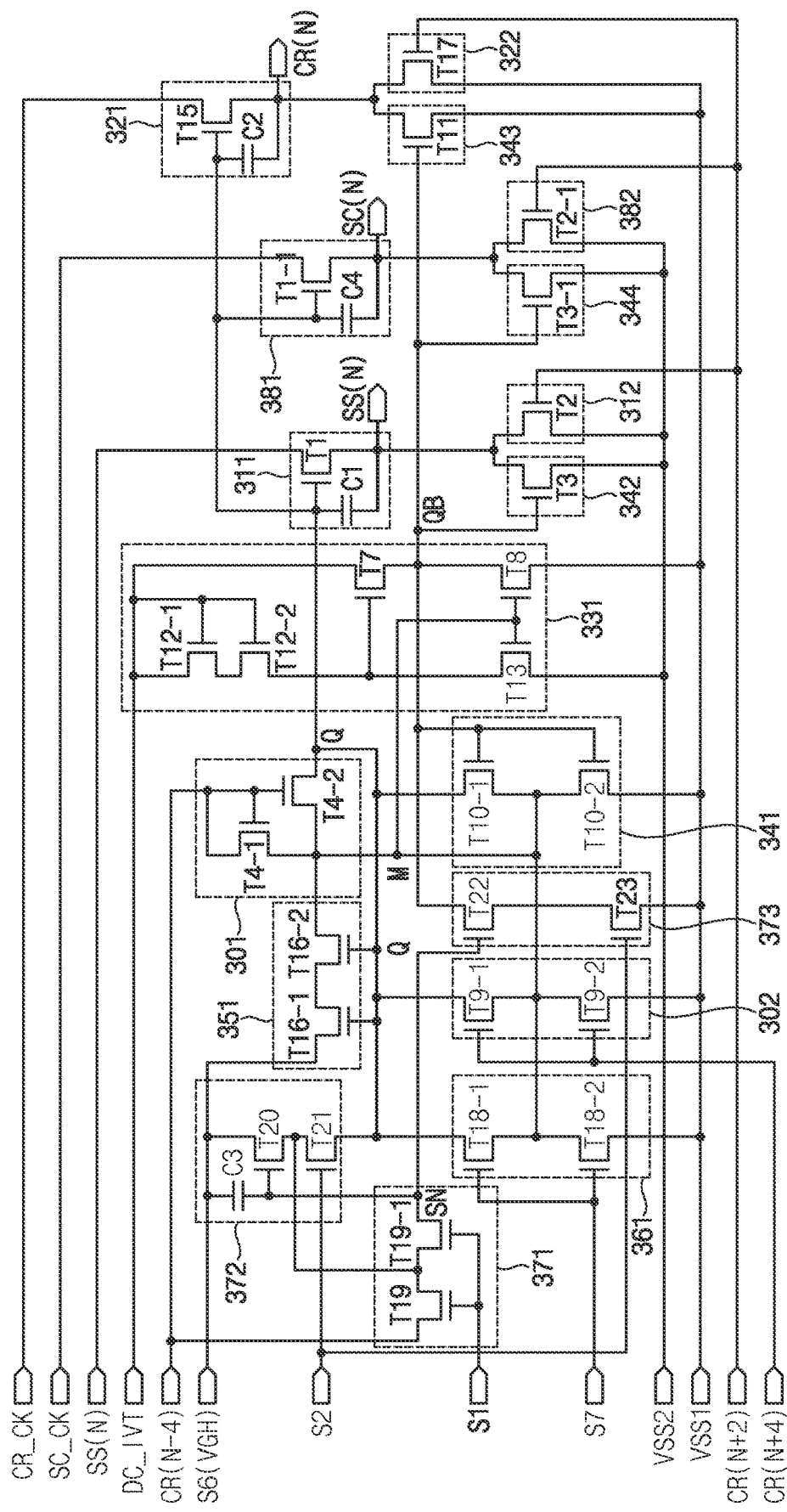
FIG. 15 is a circuit diagram illustrating a gate driving circuit of a gate driver of a display apparatus according to yet another embodiment of the present invention.

FIG. 15 is a circuit diagram illustrating a gate driving circuit of a gate driver 300 of a display apparatus according to yet another embodiment of the present invention.

The gate driver and the display apparatus according to the present embodiment are substantially the same as the gate driver and the display apparatus of the previous embodiment explained referring to FIGS. 1 to 4 and 9 to 12 except that the gate driving circuit further includes a second pull-up circuit, a second pull-down circuit and a fourth holding circuit. Thus, the same reference numerals will be used to refer to the same or like parts as those described in the previous embodiment of FIGS. 1 to 4 and 9 to 12 and any repetitive explanation concerning the above elements will be omitted.

Referring to FIGS. 1, 2 and 9 to 12 and 15, the display apparatus includes a display panel 100 and a display panel driver. The display panel driver includes a driving controller 200, a gate driver 300, a gamma reference voltage generator 400 and a data driver 500.

The gate driving circuit may include a plurality of stages. For example, a first stage of the gate driving circuit may output a gate signal corresponding to a first gate line and a second stage of the gate driving circuit may output a gate signal corresponding to a second gate line.

The gate driving circuit may include a first pull-up control circuit 301, a pull-up circuit 311, a pull-down circuit 312 and an inverting circuit 331.

The first pull-up control circuit 301 may apply a previous carry signal CR(N−4) which is one of carry signals of previous stages to a first control node Q in response to the previous carry signal CR(N−4).

The pull-up circuit 311 may output a gate clock signal SS_CK as a gate output signal SS(N) in response to a signal of the first control node Q. Herein, SS(N) may indicate a sensing gate signal of the N-th stage (the present stage).

The pull-down circuit 312 may output a second low voltage VSS2 as the gate output signal SS(N) in response to a first next carry signal CR(N+2) which is one of carry signals of next stages.

The inverting circuit 331 may output one of a first signal DC_IVT and a first low voltage VSS1 to a third control node QB in response to the first signal DC_IVT and a signal of the second control node M.

For example, the inverting circuit 331 may include a 12-1 switching element T12-1 including a control electrode for receiving the first signal DC_IVT, a first electrode for receiving the first signal DC_IVT and a second electrode connected to a twelfth intermediate node, a 12-2 switching element T12-2 including a control electrode for receiving the first signal DC_IVT, a first electrode connected to the twelfth intermediate node and a second electrode connected to a control electrode of a seventh switching element T7, the seventh switching element T7 including the control electrode connected to the second electrode of the 12-2 switching element T12-2, a first electrode for receiving the first signal DC_IVT and a second electrode connected to the third control node QB, a thirteenth switching element T13 including a control electrode connected to the second control node M, a first electrode connected to the control electrode of the seventh switching element T7 and a second electrode for receiving the second low voltage VSS2 and an eighth switching element T8 including a control electrode connected to the second control node M, a first electrode connected to the third control node QB and a second electrode for receiving the first low voltage VSS1.

Although the inverting circuit 331 includes two switching elements T12-1 and T12-2 connected to each other in series for preventing a leakage in the present embodiment, the present invention may not be limited thereto. Alternatively, the inverting circuit 331 may include one switching element instead of the two switching elements T12-1 and T12-2 or three or more switching elements connected to each other in series instead of the two switching elements T12-1 and T12-2.

As explained above, in the present embodiment, the control node (the first control node Q) of the pull-up circuit 311 and the control node (the second control node M) of the inverting circuit 331 may be separated. A maximum voltage of the second control node M may be less than a maximum voltage of the first control node Q. Thus, a positive bias temperature stress applied to the eighth switching element T8 and the thirteenth switching element T13 in the inverting circuit 331 may be reduced so that a degree of a shift of threshold voltages of the eighth switching element T8 and the thirteenth switching element T13 in the inverting circuit may be reduced.

The gate driving circuit may further include a second pull-up circuit 381 for outputting a second gate clock signal SC_CK as a second gate output signal SC(N) in response to the signal of the first control node Q and a second pull-down circuit 382 for outputting the second low voltage VSS2 as the second gate output signal SC(N) in response to the first next carry signal CR(N+2). Herein, SC(N) may indicate a scan gate signal of the N-th stage (the present stage).

For example, the second pull-up circuit 381 may include a 1-1 switching element T1-1 including a control electrode connected to the first control node Q, a first electrode for receiving the second gate clock signal SC_CK and a second electrode connected to a second gate output terminal and a fourth capacitor C4 including a first end connected to the control electrode of the 1-1 switching element T1-1 and a second end connected to the second gate output terminal.

For example, the second pull-down circuit 382 may include a 2-1 switching element T2-1 including a control electrode for receiving the first next carry signal CR(N+2), a first electrode for receiving the second low voltage VSS2 and a second electrode connected to the second gate output terminal.

The gate driving circuit may further include a fourth holding circuit 344 for outputting the second low voltage VSS2 as the second gate output signal SC(N) in response to the signal of the third control node QB.

For example, the fourth holding circuit 344 may include a 3-1 switching element T3-1 including a control electrode connected to the third control node QB, a first electrode for receiving the second low voltage VSS2 and a second electrode connected to the second gate output terminal.

According to the present embodiment, the control node Q of the pull-up circuit 311 and the control node M of the inverting circuit 331 may be separated. A maximum voltage of the control node M of the inverting circuit 331 may be less than a maximum voltage of the control node Q of the pull-up circuit 311. Thus, a positive bias temperature stress applied to the eighth switching element T8 and the thirteenth switching element T13 in the inverting circuit 331 may be reduced so that the degree of the shift of the threshold voltages of the eighth switching element T8 and the thirteenth switching element T13 in the inverting circuit 331 may be reduced.

When the degree of the shift of the threshold voltages of the switching elements T8 and T13 in the inverting circuit 331 is reduced, the reliability of the gate driving circuit may be effectively enhanced and the lifetime of the gate driving circuit may be effectively increased.

Figure 16:
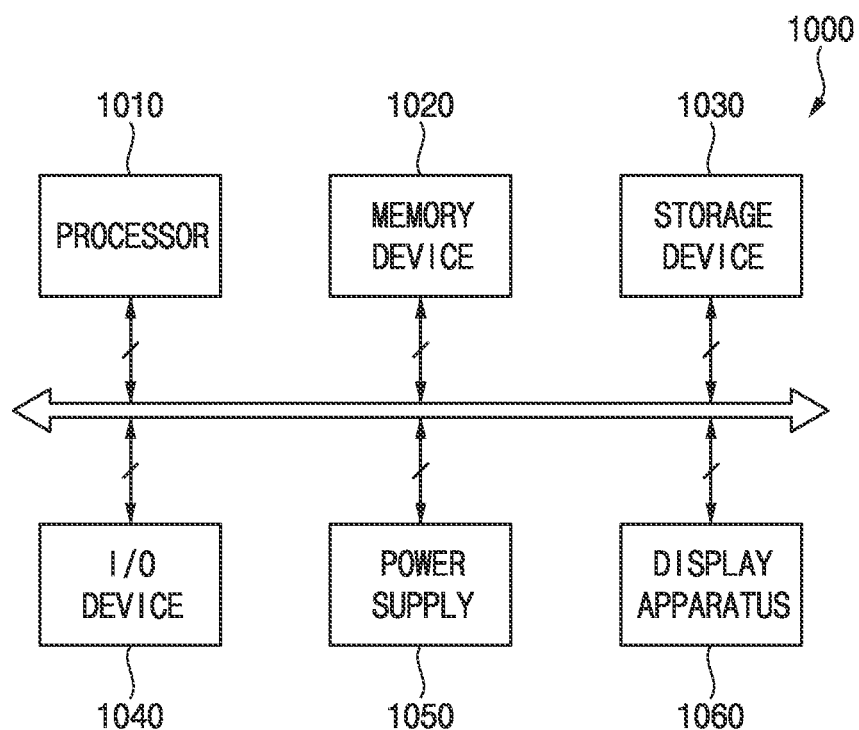
FIG. 16 is a block diagram illustrating an electronic apparatus according to an embodiment of the present invention.
Figure 17:
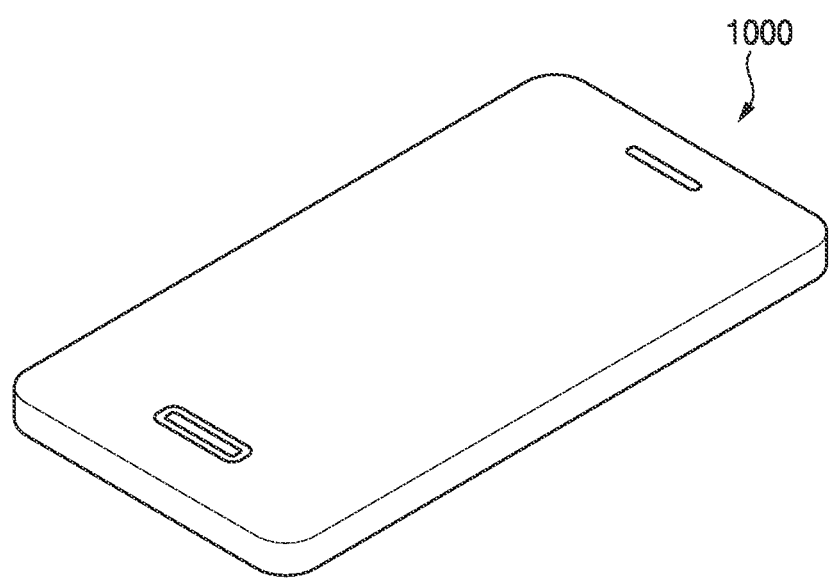
FIG. 17 is a diagram illustrating an example in which the electronic apparatus of FIG. 16 is implemented as a smart phone.

FIG. 16 is a block diagram illustrating an electronic apparatus according to an embodiment of the present invention. FIG. 17 is a diagram illustrating an example in which the electronic apparatus of FIG. 16 is implemented as a smart phone.

Referring to FIGS. 16 and 17, the electronic apparatus 1000 may include a processor 1010, a memory device 1020, a storage device 1030, an input/output ("I/O") device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus ("USB") device, other electronic apparatuses, etc.

In an embodiment, as illustrated in FIG. 17, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display ("HMD") device, or the like.

The processor 1010 may perform various computing functions or various tasks. The processor 1010 may be a micro-processor, a central processing unit ("CPU"), an application processor ("AP"), or the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, or the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the gate driving circuit and the display apparatus, the degree of the shift of the threshold voltage of the switching element in the inverting circuit may be reduced so that the lifetime of the circuit may be increased.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A gate driving circuit comprising:
   a first pull-up control circuit configured to apply a previous carry signal which is one of carry signals of previous stages to a first control node in response to the previous carry signal;
   a pull-up circuit configured to output a gate clock signal as a gate output signal in response to a signal of the first control node;

a pull-down circuit configured to output a second low voltage as the gate output signal in response to a first next carry signal which is one of carry signals of next stages; and an inverting circuit configured to output one of a first signal and a first low voltage to a third control node in response to the first signal and a signal of a second control node, wherein the first control node and the second control node are separate and distinct nodes.

2. The gate driving circuit of claim 1, wherein a maximum voltage of the second control node is less than a maximum voltage of the first control node.

3. The gate driving circuit of claim 1, wherein the first signal is a direct-current inverter voltage.

4. The gate driving circuit of claim 1, wherein the first signal is a gate high voltage defining a high level of the gate output signal.

5. The gate driving circuit of claim 1, wherein the first signal is a gate clock signal.

6. The gate driving circuit of claim 1, wherein the inverting circuit comprises:
   a 12-1 switching element including a control electrode configured to receive the first signal, a first electrode configured to receive the first signal and a second electrode connected to a twelfth intermediate node;
   a 12-2 switching element including a control electrode configured to receive the first signal, a first electrode connected to the twelfth intermediate node and a second electrode connected to a control electrode of a seventh switching element;
   the seventh switching element including the control electrode connected to the second electrode of the 12-2 switching element, a first electrode configured to receive the first signal and a second electrode connected to the third control node;
   a thirteenth switching element including a control electrode connected to the second control node, a first electrode connected to the control electrode of the seventh switching element and a second electrode configured to receive the second low voltage; and
   an eighth switching element including a control electrode connected to the second control node, a first electrode connected to the third control node and a second electrode configured to receive the first low voltage.

7. The gate driving circuit of claim 6, further comprising:
   an inverting control circuit configured to apply a gate high voltage defining a high level of the gate output signal to the second control node in response to the signal of the first control node.

8. The gate driving circuit of claim 7, wherein the inverting control circuit comprises:
   a 16-1 switching element including a control electrode connected to the first control node, a first electrode configured to receive the gate high voltage and a second electrode connected to a sixteenth intermediate node; and
   a 16-2 switching element including a control electrode connected to the first control node, a first electrode connected to the sixteenth intermediate node and a second electrode connected to the second control node.

9. The gate driving circuit of claim 1, further comprising:
   a second pull-up control circuit configured to apply the first low voltage to the first control node in response to a second next carry signal which is one of the carry signals of the next stages.

10. The gate driving circuit of claim 1, further comprising:
    a first holding circuit configured to apply the first low voltage to the first control node in response to a signal of the third control node.

11. The gate driving circuit of claim 1, further comprising:
    a second holding circuit configured to output the second low voltage as the gate output signal in response to a signal of the third control node.

12. The gate driving circuit of claim 1, further comprising:
    a carry pull-up circuit configured to output a carry clock signal as a carry signal in response to the signal of the first control node; and
    a carry pull-down circuit configured to output the first low voltage as the carry signal in response to the first next carry signal.

13. The gate driving circuit of claim 12, further comprising:
    a third holding circuit configured to output the first low voltage as the carry signal in response to a signal of the third control node.

14. The gate driving circuit of claim 1, further comprising:
    a second pull-up circuit configured to output a second gate clock signal as a second gate output signal in response to the signal of the first control node; and
    a second pull-down circuit configured to output the second low voltage as the second gate output signal in response to the first next carry signal.

15. The gate driving circuit of claim 14, further comprising:
    a fourth holding circuit configured to output the second low voltage as the second gate output signal in response to a signal of the third control node.

16. A gate driving circuit comprising: a first pull-up control circuit configured to apply a previous carry signal which is one of carry signals of previous stages to a first control node in response to the previous carry signal; a pull-up circuit configured to output a gate clock signal as a gate output signal in response to a signal of the first control node; a pull-down circuit configured to output a second low voltage as the gate output signal in response to a first next carry signal which is one of carry signals of next stages; an inverting circuit configured to output one of a first signal and a first low voltage to a third control node in response to the first signal and a signal of a second control node; and a reset circuit configured to apply the first low voltage to the first control node in response to a reset signal, wherein the first control node and the second control node are separate and distinct nodes.

17. The gate driving circuit of claim 1, further comprising:
    a sensing selecting circuit configured to apply the previous carry signal to a sensing control node in response to a first sensing signal.

18. The gate driving circuit of claim 17, further comprising:
    a first sensing control circuit configured to apply a gate high voltage defining a high level of the gate output signal to the first control node in response to a signal of the sensing control node and a second sensing signal; and
    a second sensing control circuit configured to apply the first low voltage to the third control node in response to the signal of the sensing control node and the second sensing signal.

19. The gate driving circuit of claim 1, wherein the first pull-up control circuit comprises:

a 4-1 switching element including a control electrode configured to receive the previous carry signal, a first electrode configured to receive the previous carry signal and a second electrode connected to the second control node; and a 4-2 switching element including a control electrode configured to receive the previous carry signal, a first electrode connected to the second control node and a second electrode connected to the first control node, wherein the pull-up circuit comprises:

a first switching element including a control electrode connected to the first control node, a first electrode configured to receive the gate clock signal and a second electrode connected to a gate output terminal; and a first capacitor including a first end connected to the control electrode of the first switching element and a second end connected to the gate output terminal, and wherein the pull-down circuit comprises:

a second switching element including a control electrode configured to receive the first next carry signal, a first electrode configured to receive the second low voltage and a second electrode connected to the gate output terminal.

20. A display apparatus comprising:

a display panel;

a gate driver configured to output a gate signal to a gate line of the display panel; and a data driver configured to output a data voltage to a data line of the display panel, wherein a gate driving circuit of the gate driver comprises:

a first pull-up control circuit configured to apply a previous carry signal which is one of carry signals of previous stages to a first control node in response to the previous carry signal;

a pull-up circuit configured to output a gate clock signal as a gate output signal in response to a signal of the first control node;

a pull-down circuit configured to output a second low voltage as the gate output signal in response to a first next carry signal which is one of carry signals of next stages; and an inverting circuit configured to output one of a first signal and a first low voltage to a third control node in response to the first signal and a signal of a second control node, wherein the first control node and the second control node are separate and distinct nodes.

* * * * *